(12) United States Patent
Sebot et al.

(10) Patent No.: US 8,869,294 B2
(45) Date of Patent: Oct. 21, 2014

(54) MITIGATING BRANCH PREDICTION AND OTHER TIMING BASED SIDE CHANNEL ATTACKS

(75) Inventors: Julien Sebot, Haifa (IL); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1546 days.

(21) Appl. No.: 11/950,658

(22) Filed: Dec. 5, 2007

(65) Prior Publication Data

US 2008/0155679 A1 Jun. 26, 2008

Related U.S. Application Data

(60) Provisional application No. 60/873,062, filed on Dec. 5, 2006.

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G06F 11/00* | (2006.01) |
| *G06F 12/16* | (2006.01) |
| *G11C 7/00* | (2006.01) |
| *G08B 23/00* | (2006.01) |
| *H04N 7/16* | (2011.01) |
| *G06F 21/71* | (2013.01) |
| *G06F 21/55* | (2013.01) |
| *G06F 21/60* | (2013.01) |
| *G06F 21/74* | (2013.01) |

(52) U.S. Cl.
CPC .............. *G06F 21/556* (2013.01); *G06F 21/71* (2013.01); *G06F 21/60* (2013.01); *G06F 21/74* (2013.01)
USPC ................................... 726/27; 726/22; 726/17

(58) Field of Classification Search
CPC ... G06F 21/556; G06F 21/60; G06F 21/6227; G06F 21/74; G06F 9/52
See application file for complete search history.

(56) References Cited

U.S. PATENT DOCUMENTS

| | | | | |
|---|---|---|---|---|
| 4,574,350 | A | * | 3/1986 | Starr .............................. 710/200 |
| 5,630,166 | A | * | 5/1997 | Gamache et al. ............... 712/29 |
| 5,790,840 | A | * | 8/1998 | Bulka et al. .................. 713/502 |
| 6,199,181 | B1 | * | 3/2001 | Rechef et al. .................... 714/38 |
| 6,218,941 | B1 | * | 4/2001 | Cromer et al. ............. 340/572.1 |
| 2003/0056070 | A1 | * | 3/2003 | Dayan et al. .................. 711/163 |
| 2005/0138370 | A1 | * | 6/2005 | Goud et al. .................... 713/164 |

* cited by examiner

*Primary Examiner* — Philip Chea
*Assistant Examiner* — Trong Nguyen
(74) *Attorney, Agent, or Firm* — Thomas R. Lane

(57) ABSTRACT

To provide hardware protection against timing based side channel attacks, a processor's microarchitecture enables an OS to determine which applications have the privilege to read timestamp and performance counters. Using a white list of applications, and an authentication mechanism to authenticate applications, a legitimate Protection Required Application (PRA) may temporarily prevent other applications from reading timestamp and performance counters while it executes (or excutes sensitive operations).

12 Claims, 2 Drawing Sheets

METHOD 200

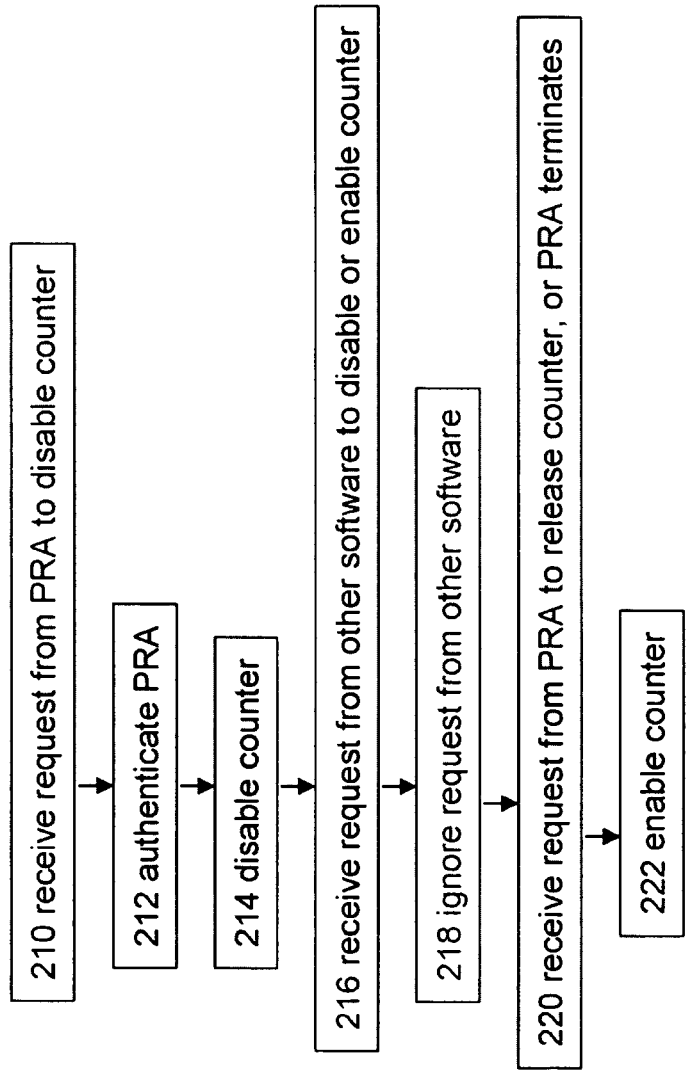

MITIGATING BRANCH PREDICTION AND OTHER TIMING BASED SIDE CHANNEL ATTACKS

REFERENCE TO PRIOR PROVISIONAL APPLICATION

This application claims the benefit of U.S. Provisional Application No. 60/873,062, filed Dec. 5, 2006.

BACKGROUND

1. Field

The present invention relates generally to computer security and, more specifically, to mitigating side channel attacks based on branch prediction activity or other timing considerations in a processor.

2. Description

New theories for attacking the security of computer systems have been proposed. These theories are called Branch Prediction Attacks (BPA) and Simple Branch Prediction Attacks (SBPA). See Onur Aciiçmez, çetin Koç, and Jean-Pierre Seifert, "Predicting Secret Keys via Branch Prediction", available on the Internet at http:**eprint.iacr.orq*2006*288 (the "/"s have been replaced with "*"s herein) (accepted to the upcoming Rivest/Shamir/Adleman (RSA) 2007 conference); and Onur Aciiçmez, çetin Koç, and Jean-Pierre Seifert, "On the Power of Simple Branch Prediction Analysis", available on the Internet at http:**cryptome.orq*sbpa*sbpa.htm (the "/"s have been replaced with "*"s herein).

The papers showed how an unprivileged spy program can discover a private RSA key by using branch prediction leaks during the Square-and-Multiply (S&M) modular exponentiation procedure. The results were demonstrated on OpenSSL version 9.7 (an open source implementation of the Secure Sockets Layer (SSL) and Transport Layer Security (TLS) protocols). Careful reading of these papers leads to the conclusion that branch prediction attacks can be extended beyond the particular example of modular exponentiation in OpenSSL 9.7. In fact, the OpenSSL version 9.8 mitigations against cache attacks do not protect against the new threat. Moreover, it turns out that one of the added mitigations actually opened a door to a branch prediction attack.

New mitigations to side channel attacks are needed to deter attempts to subvert the security of a computer system.

BRIEF DESCRIPTION OF THE DRAWINGS

The features and advantages of the present invention will become apparent from the following detailed description of the present invention in which:

FIG. 2 is a flow diagram of a method embodiment of the present invention.

DETAILED DESCRIPTION

Figure 1:
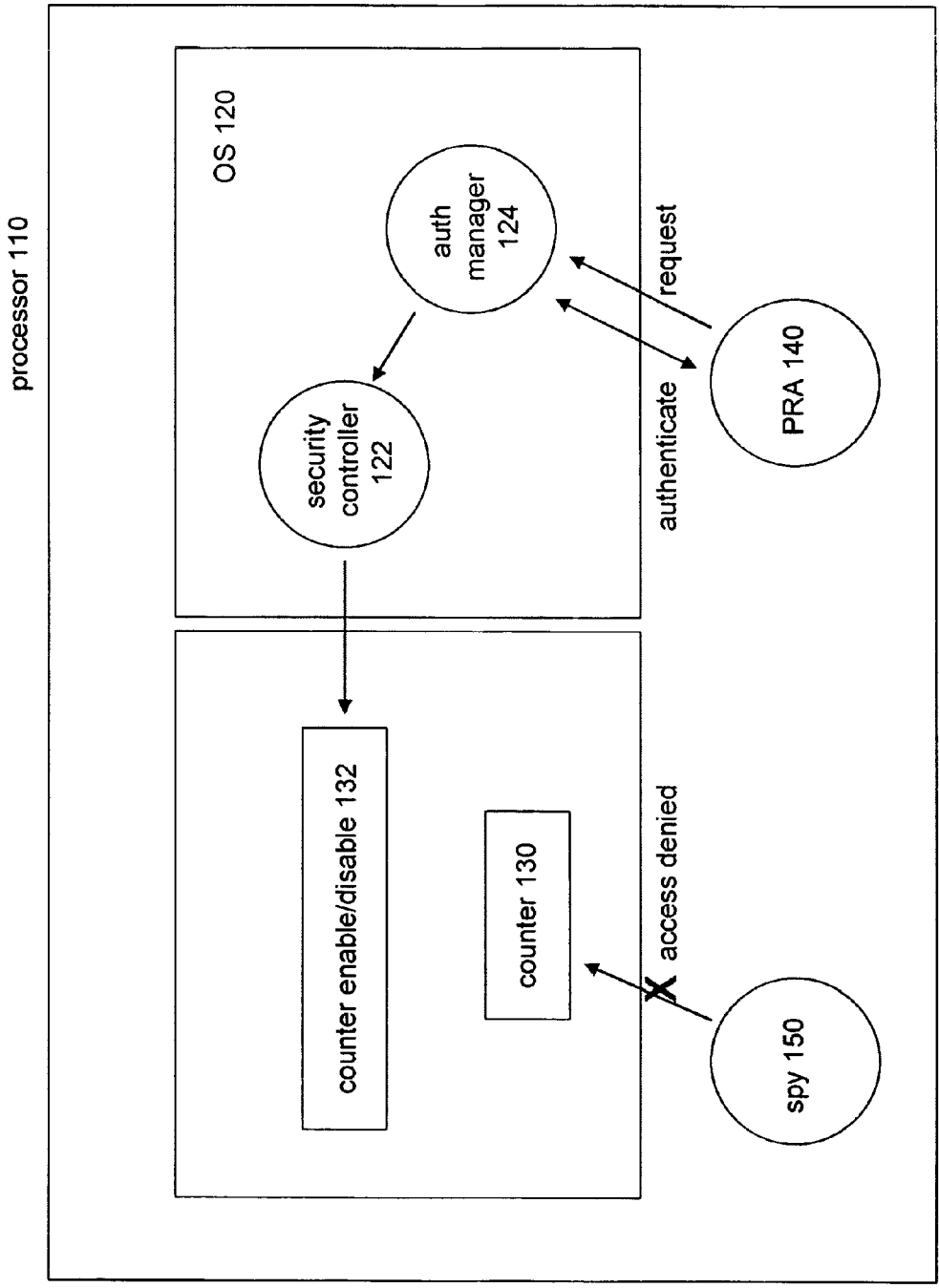
FIG. 1 is a block diagram of an apparatus embodiment of the present invention.

Branch prediction attacks may be mitigated by software techniques. However, according to an embodiment of the present invention, they may also be mitigated by a hardware mechanism that controls the processor's microarchitecture. Such an embodiment may also mitigate other timing-based side channel attacks, such as some of the cache-based attacks.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Recent attacks involving hyper-threading (HT), branch prediction analysis, and some of the shared caches attacks rely on the capability that modern microprocessors (e.g., processor 110 in FIG. 1) very precisely time specific events. This ability is dependant on the result of the two following instructions RDTSC and RDPMC, which are shown in Table I (from the Intel Software Developer's Manual, Volume 3A, System Programming Guide, part 1, page 75, November 2006 edition (available from Intel Corporation)).

Table I
Reading Performance-Monitoring and Time-Stamp Counters

The RDPMC (read performance-monitoring counter) and RDTSC (read time-stamp counter) instructions allow application programs to read the processor's performance-monitoring and time-stamp counters, respectively. Pentium 4 and Intel Xeon processors have eighteen 40-bit performance-monitoring counters; P6 family processors have two 40-bit counters. Use these counters to record either the occurrence or duration of events. Events that can be monitored are model specific; they may include the number of instructions decoded, interrupts received, or the number of cache loads. Individual counters can be set up to monitor different events. Use the system instruction WRMSR to set up values in the one of the 45 ESCRs and one of the 18 CCCR MSRs (for Pentium 4 and Intel Xeon processors); or in the PerfEvtSel0 or the PerfEvtSel1 MSR (for the P6 family processors). The RDPMC instruction loads the current count from the selected counter into the EDX:EAX registers.

[ . . . ]

TSD Time Stamp Disable (bit 2 of CR4)—Restricts the execution of the RDTSC instruction to procedures running at privilege level 0 when set; allows RDTSC instruction to be executed at any privilege level when clear.

PCE Performance-Monitoring Counter Enable (bit 8 of CR4)—Enables execution of the RDPMC instruction for programs or procedures running at any protection level when set; RDPMC instruction can be executed only at protection level 0 when clear.

CR4—Contains a group of flags that enable several architectural extensions, and indicate operating system or executive support for specific processor capabilities. The control registers can be read and loaded (or modified) using the move-to-or-from-control-registers forms of the MOV instruction. In protected mode, the MOV instructions allow the control registers to be read or loaded (at privilege level 0 only). This restriction means that application programs or operating-system procedures (running at privilege levels 1, 2, or 3) are prevented from reading or loading the control registers. Normally, the RDTSC instruction can be executed by programs and procedures running at any privilege level and in virtual-8086 mode. The TSD flag allows use of this instruction to be restricted to programs and procedures running at privilege level 0.

Normally, the RDTSC instruction can be executed by programs and procedures running at any privilege level and in virtual-8086 mode. The TSD flag allows use of this instruction to be restricted to programs and procedures running at privilege level 0. A secure operating system would set the TSD flag during system initialization to disable user access to the time-stamp counter. An operating system that disables user access to the time-stamp counter should emulate the instruction through a user-accessible programming interface.

Before the Pentium MMX generation of processors, no precise means of measuring time were provided to users (at Ring 3) but were given the Ring 0 Operating System (OS). Developers found this inconvenient, and the RDTSC and RDPMC were eventually exposed to Ring 3 users/applications. Still the ability to disable (in one embodiment, by programming TSD or PCD as described in Table 1. which may be represented by counter enable/disable 132 in FIG.1) user-access to the counters exists (see system programming guide as a method for a secure OS in Table 1).

Disabling counters almost guarantees that timing based attacks cannot be executed by Ring 3 spies (e.g. spy 150 in FIG. 1). However, since performance and timestamp counters (e.g., counter 130 in FIG. 1) are very valuable to many users permanently disabling them is perceived as a conterproductive and unacceptable approach. Therefore, an embodiment of the present invention provides for .a platform where the OS (e.g., security controller 112 in OS 120 in FIG. 1) provides the service of counters disabling to "trusted" and "registered" applications.

This embodiment includes two modes. In regular mode, users/applications have access to all counters. A Protection Required Application (PRA, e.g., PRA 140 in FIG. 1), such as OpenSSL for example, may authenticate itself (e.g., 212 in method 200 in FIG. 2) to the OS (e,g. . . to auth manager 124 in FIG. 1) and request (e.g., 210 in FIG. 2) the OS to switch to a "secure mode" (SM) (e.g., 214 in FIG. 2) until this PRA terminates or turns the SM request off (e.g., 220 in FIG. 2).

From the OS perspective, satisfying an SM request requires only a "write to CR4", which could be exposed as as "SM-enter" instruction. Leaving SM is done in a similar way.

In order to avoid having any application request "SM", and in particular in order to avoid (e.g., 218 in FIG. 2) such requests from malicious applications (attempting to interrupt with the platform's operation, e.g. 216 in FIG. 2), the OS may decide whether or not to respect an SM request from a Ring 3 application. In one embodiment, the OS has a "white list" of PRAs whose SM requests are honored, and the OS uses any known means of authentication to make sure that SM is not granted to a malicious imposter. In the event of execution of multiple simultaneous PRA, only the last request to leave SM is be fulfilled.

Another issue is virtualization. For example, in a processor from Intel Corporation, CR4 may be virtualized, and disabling it in one virtual environment Will not disable it on other virtual machines. Virtualizing performance and timestamp counters as well, by having the Virtual Machine Manager (VMM) save and restore them when switching between virtual guests would make the spying of a PRA from another VMM harder but would not prevent it totally.

The reason is that even with virtualization of the counters, a spy process running in another virtualized OS may still have a slight chance of observing side effects on resources like BPU and caches (there would be much more noise in these measures than there are today but chances of observing what the spy is looking are non-zero).

To mitigate this option, an embodiment of the present invention includes a mechanism similar to the PRA., but at the VMM level, The VMM grants a virtualized OS the right to lock globally the counters, and only this OS is allowed to release that lock (e.g., 222 on FIG. 2). This may protect as well a guest OS in need of a secure environment of other guest OS that might be malicious (even if the attacker has access to ring 0 in that malicious guest OS).

The downside of this protection is that a malicious software or virtualized OS that would break the OS and VMM authentification mechanism can disable the counters all the time. However, this would not compromise the PRA's security, but may at most disrupt innocent applications that need to access those counters legitimately. This type of "denial of service" attack is, however, nontrivial to mount, and can at most achieve a harrassing effect. Compared with the potential side channel threat, this is a minor effect.

This protection would, in effect, make the CR4 bits relative to the counters read/write permission global and only modifiable by a VMM service. This would require the addition of this service to the current VMM ones and alter the current virtualization definition that envision CR4 as fully virtualized.

In summary, embodiments of the present invention provide hardware protection against timing-based side channel attacks by using a processor's microarchitecture to enable (Ring 0) OS to determine which applications have the privilege to read timestamp and performance counters. Using a white list of applications, and an authentication mechanism to authenticate applications, a legitimate PRA may temporarily prevent other applications from reading timestamp and performance counters while it executes (or excutes sensitive operations). The additional mechanisms required to enable this feature are: (1) a software level application program interface allowing a secure application to request the OS to lock the access to the timestamp and performance counters, and that the lock is released only by the process that requested it initially, (2) a mechanism to authenticate applications from a white list, (3) a mechanism to securely distribute and maintain white lists, and (4) that this mechanism can be extended at the VMM level in the event of a virtualized environment.

Although the operations described herein may be described as a sequential process, some of the operations may in fact be performed in parallel or concurrently. In addition, in some embodiments the order of the operations may be rearranged.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by a machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action and produce a result.

What is claimed is:

1. A method comprising:
   receiving, by first software running at a first privilege level on a processor, a first request, the first request by second software running at a second privilege level on the processor, to cause the processor to enter a secure mode, wherein the first privilege level is more privileged than the second privilege level;
   authenticating the second software in response to receiving the first request, wherein authenticating the second software includes verifying that the second software is on a list of trusted software;
   executing, by the first software in response to receiving the request, a first instruction to write to a control register, wherein the control register contains a plurality of control flags including a first control flag to restrict execution of a second instruction to software running at the first privilege level, wherein the second instruction is to read a time stamp counter; and
   disabling, in response to executing the first instruction, reading of the time stamp counter by software running at the second privilege level.

2. The method of claim 1, further comprising:
   receiving, by the first software, a second request, the second request by third software running at the second privilege level, to read the time stamp counter; ignoring the second request;
   receiving, by the first software, a third request, the third request by the second software, to enable reading of the time stamp counter; and
   enabling reading of the time stamp counter in response to the second request.

3. The method of claim 1, further comprising enabling reading of the time stamp counter in response to termination of the second software.

4. The method of claim 1, wherein the first software is operating system software.

5. The method of claim 4, wherein the second software is an application program.

6. The method of claim 1, wherein the first software is a virtual machine monitor.

7. The method of claim 6, wherein the second software is operating system software.

8. An apparatus comprising:
   a processor to execute first software at a first privilege level and second software at a second privilege level, wherein the first privilege level is more privileged than the second privilege level; and
   a time stamp counter to have read access by software running at the second privilege level disabled in response to a request to cause the processor enter a secure mode, the request by the second software to the first software, wherein the second software is authenticated in response to receiving the request, and wherein authenticating the second software includes verifying that the second software is on a list of trusted software; and
   a control register containing a plurality of control flags including a first control flag to restrict execution of a second instruction to software running at the first privilege level, wherein the second instruction is to read the time stamp counter; wherein read access by software running at the second level is to be disabled by the first software executing a first instruction to write to the control register.

9. The apparatus of claim 8, wherein the first software is operating system software.

10. The apparatus of claim 9, wherein the second software is an application program.

11. The apparatus of claim 8, wherein the first software is a virtual machine monitor.

12. The apparatus of claim 11, wherein the second software is operating system software.

* * * * *